T. F. GREENLEAF.
Oven Lamp.
No. 197,266. Patented Nov. 20, 1877.
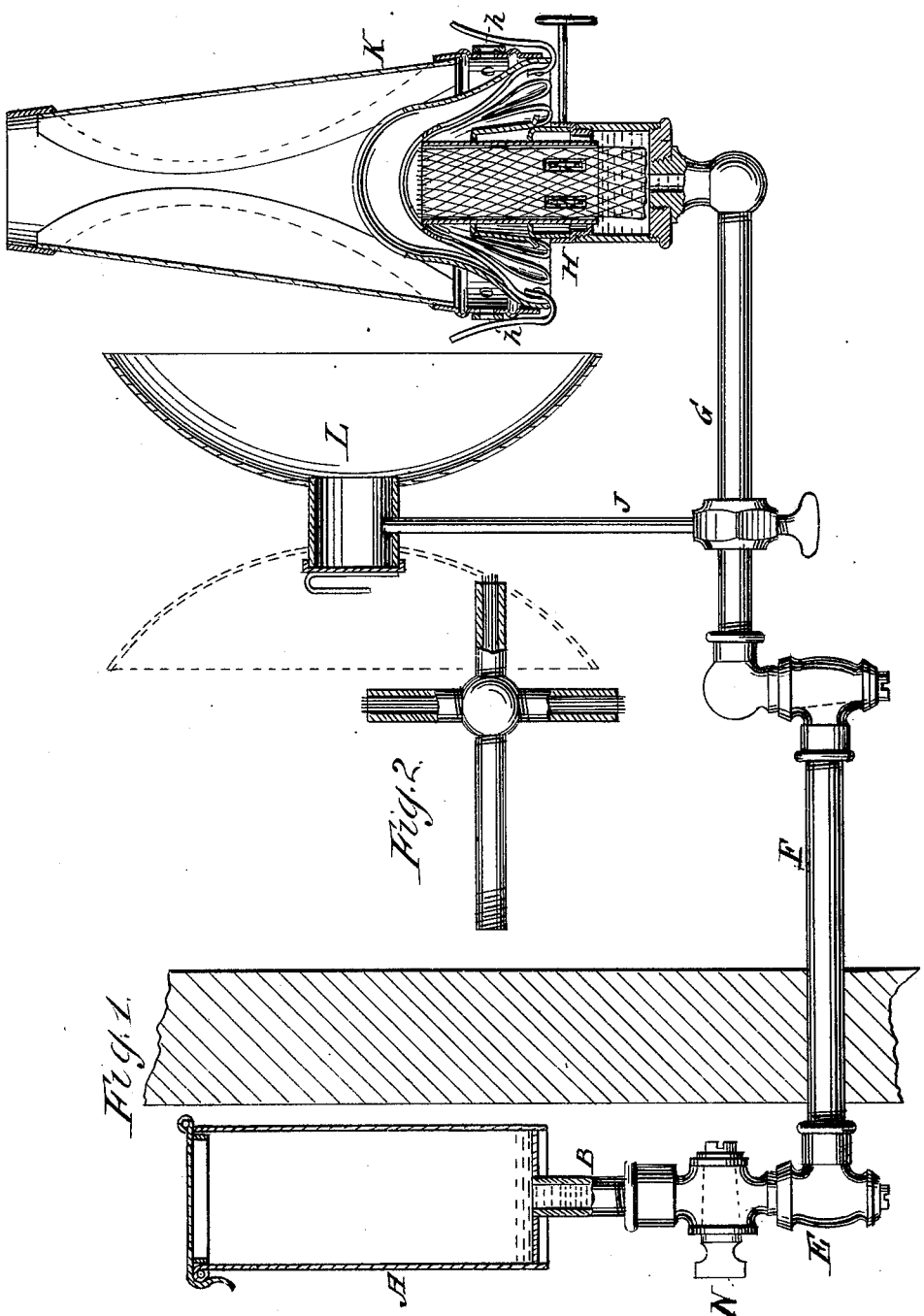

UNITED STATES PATENT OFFICE.

THORO F. GREENLEAF, OF WESTBOROUGH, MASSACHUSETTS.

IMPROVEMENT IN OVEN-LAMPS.

Specification forming part of Letters Patent No. 197,266, dated November 20, 1877; application filed October 6, 1877.

*To all whom it may concern:*

Be it known that I, THORO F. GREENLEAF, of Westborough, in the county of Worcester and State of Massachusetts, have invented a new and Improved Oven-Lamp, of which the following is a specification:

This invention relates to lamps which are especially designed for bakers' ovens for the purpose of illuminating them, so that the baker can properly conduct his work; and the nature of my invention consists in an adjustable tubular bracket, which has connected to one end of it, outside of the wall of the oven, an oil-reservoir, and which has connected to it, inside of the oven-wall, a burner and a reflector, as will be fully understood from the following description.

In the drawing hereunto annexed, Figure 1 is an elevation, partly in section, of my improved oven-lamp. Fig. 2 shows a burner of a cruciform shape, partly in section.

Similar letters of reference indicate corresponding parts.

The letter A designates a reservoir for containing kerosene or other burning-fluid. This reservoir is arranged and secured on the outside of the wall of the baking-oven for the purpose of safety, and also for keeping cool the oil contained in it. From the bottom of the reservoir depends a short pipe, B, which is provided with a cock, N, and which is connected by a coupling, E, to a horizontal pipe, F, that may be any desired length.

G designates a horizontal pipe, which is so coupled to the pipe F that it is free to turn horizontally, and to the outer free end of pipe G a burner, H, of any suitable description, is applied.

The drawing shows two kinds of burners, one of which (represented by Fig. 2) is cruciform, and can be screwed into the joint-coupling when the pipe G is removed from this coupling. This cruciform burner of Fig. 2 gives three different flames.

Back of the burner H, and adjustably secured to the pipe G, is a rod, J, which stands upright, and has a mirror, L, removably applied to it. The drawing shows the concave side of the mirror toward the burner; but I prefer to have the convex side presented to the burner, so as to diffuse the light in the oven.

The letter K, Fig. 1, shows a chimney with flattened sides, which are formed, in part, of mica, suitably secured to the metal portion. The base portion of the chimney K is circular, and has perforations through it, which, with similar perforations through a band, h, forms a register that will allow air to be admitted into the chimney in regulated quantities.

Having thus described my invention, I claim as new and desire to secure by Letters Patent—

In combination with the reservoir A, arranged outside of the wall of a baker's oven, and with a burner, K, and reflector L, the pipes B F and the adjustable pipe G, arranged substantially in the manner described.

THORO F. GREENLEAF.

Witnesses:
L. K. TRAVIS,
W. R. GOULD.